(12) United States Patent
Shim (10) Patent No.: US 12,014,292 B2
(45) Date of Patent: Jun. 18, 2024

(54) METHOD FOR OPTIMALLY SIMULATING FLUID FLOW RESULTS USING TSALLIS OR RENYI DIVERGENCE

(71) Applicant: KOREA INSTITUTE OF SCIENCE AND TECHNOLOGY, Seoul (KR)

(72) Inventor: Jae Wan Shim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 703 days.

(21) Appl. No.: 16/250,891

(22) Filed: Jan. 17, 2019

(65) Prior Publication Data

US 2020/0074337 A1 Mar. 5, 2020

(30) Foreign Application Priority Data

Aug. 28, 2018 (KR) .................. 10-2018-0101131

(51) Int. Cl.
*G06F 30/28* (2020.01)
*G06F 17/18* (2006.01)
(Continued)

(52) U.S. Cl.
CPC ............... *G06N 7/01* (2023.01); *G06F 17/18* (2013.01); *G06F 30/20* (2020.01); *G06F 30/25* (2020.01); *G06F 30/28* (2020.01); *G06F 2111/10* (2020.01)

(58) Field of Classification Search
CPC ..... G06N 7/005; G06F 30/20; G06F 2111/10; G06F 2113/08; G06F 30/25; G06F 30/28
See application file for complete search history.

(56) References Cited

U.S. PATENT DOCUMENTS

2008/0052047 A1 2/2008 Coffey et al.
2012/0296615 A1* 11/2012 Shim ................ G06F 30/20
703/9

(Continued)

FOREIGN PATENT DOCUMENTS

JP 2012-83958 A 4/2012
KR 20150091592 A * 8/2015
KR 10-1562863 B1 10/2015

OTHER PUBLICATIONS

He, Xiaoyi, and Li-Shi Luo. "A priori derivation of the lattice Boltzmann equation." Physical Review E 55.6 (1997): R6333. (Year: 1997).*

(Continued)

*Primary Examiner* — Boris Gorney
*Assistant Examiner* — David A Hopkins
(74) *Attorney, Agent, or Firm* — Rabin & Berdo, P.C.

(57) ABSTRACT

A method for optimally simulating fluid flow around a real object by (a) defining an initial state of a simulation space having a plurality of lattices with nodes; determining a space occupation state by objects, a fluid state, and a probability distribution state of a particle for respective nodes; generating a flow effect for the respective nodes using a collision rule which is a probability distribution of the particle with respect to the velocity thereof, obtained by satisfying a condition at which a Tsallis or a Rényi-divergence between the collision rule itself and a reference collision rule provides a simulated fluid flow result; and renewing the initial state and varying the space occupation state based on the simulated fluid flow result; and (b) based on step (a) modeling fluid flow around the real object.

16 Claims, 4 Drawing Sheets

(51) Int. Cl.
    *G06F 30/20*     (2020.01)
    *G06F 30/25*     (2020.01)
    *G06N 7/01*     (2023.01)
    *G06F 111/10*     (2020.01)

(56) References Cited

U.S. PATENT DOCUMENTS

2017/0124232 A1*   5/2017   Chen ...................... G06F 17/11
2019/0258764 A1*   8/2019   Gopalakrishnan ...... G06T 17/20

OTHER PUBLICATIONS

Karlin, Iliya V., Shyam S. Chikatamarla, and Santosh Ansumali. "Elements of the lattice Boltzmann method II: Kinetics and hydrodynamics in one dimension." Communications in Computational Physics 2.2 (2007): 196-238. (Year: 2007).*
Tsallis, Constantino. "Some comments on Boltzmann-Gibbs statistical mechanics." Chaos, Solitons & Fractals 6 (1995): 539-559. ( Year: 1995).*
Aidun, Cyrus K., and Jonathan R. Clausen. "Lattice-Boltzmann method for complex flows." Annual review of fluid mechanics 42 (2010): 439-472. (Year: 2010).*
Ansumali, Santosh, et al. "Entropic lattice Boltzmann method for microflows." Physica A: Statistical Mechanics and its Applications 359 (2006): 289-305. (Year: 2006).*
Ansumali, Santosh, and Iliya V. Karlin. "Single relaxation time model for entropic lattice Boltzmann methods." Physical Review E 65.5 (2002): 056312. (Year: 2002).*
Boghosian, Bruce M., et al. "Galilean-invariant lattice-Boltzmann models with H theorem." Physical Review E 68.2 (2003): 025103. (Year: 2003).*
Brownlee, R. A., Alexander N. Gorban, and Jeremy Levesley. "Nonequilibrium entropy limiters in lattice Boltzmann methods." Physica A: Statistical Mechanics and its Applications 387.2-3 (2008): 385-406. (Year: 2008).*
Chen, Hudong, Isaac Goldhirsch, and Steven A. Orszag. "Discrete rotational symmetry, moment isotropy, and higher order lattice Boltzmann models." Journal of Scientific Computing 34.1 (2008): 87-112. (Year: 2008).*
Gorban, Alexander N., and Dave Packwood. "Allowed and forbidden regimes of entropy balance in lattice Boltzmann collisions." Physical Review E 86.2 (2012): 025701. (Year: 2012).*
Gorban, Alexander N., and Iliya V. Karlin. "Methods of nonlinear kinetics." arXiv preprint cond-mat/0306062 (2003). (Year: 2003).*
Gotoh, Toshiyuki, and Robert H. Kraichnan. "Turbulence and Tsallis statistics." Physica D: Nonlinear Phenomena 193.1-4 (2004): 231-244. (Year: 2004).*
He, Xiaoyi, and Li-Shi Luo. "Theory of the lattice Boltzmann method: From the Boltzmann equation to the lattice Boltzmann equation." Physical review E 56.6 (1997): 6811. (Year: 1997).*
He, Xiaoyi, Li-Shi Luo, and Micah Dembo. "Some progress in lattice Boltzmann method. Part I. Nonuniform mesh grids." Journal of computational Physics 129.2 (1996): 357-363. (Year: 1996).*
Keating, Brian, et al. "Entropic lattice Boltzmann representations required to recover Navier-Stokes flows." Physical Review E 75.3 (2007): 036712. (Year: 2007).*
Khazaeli, Reza, Mohammad Reza Nazari, and Abed Zadehgol. "Introducing unsteady and nonuniform source terms in entropic lattice kinetic models using Fourier series." Physical Review E 98.5 (2018): 053303. (Year: 2018).*
Perumal, D. Arumuga, and Anoop K. Dass. "A Review on the development of lattice Boltzmann computation of macro fluid flows and heat transfer." Alexandria Engineering Journal 54.4 (2015): 955-971. (Year: 2015).*
Premnath, Kannan N., and Sanjoy Banerjee. "On the three-dimensional central moment lattice Boltzmann method." Journal of Statistical Physics 143.4 (2011): 747-794. (Year: 2011).*
Tsallis, Constantino. "Beyond Boltzmann-Gibbs-Shannon in physics and elsewhere." Entropy 21.7 (2019): 696. (Year: 2019).*
Wagner, Alexander J. "A practical introduction to the lattice Boltzmann method." Adt. notes for Statistical Mechanics 463 (2008): 663. (Year: 2008).*
Wilson, Tyler. Stabilization, Extension and Unification of the Lattice Boltzmann Method Using Information Theory. Diss. University of Toronto (Canada), 2016. (Year: 2016).*
Nielsen, Frank, and Richard Nock. "On R\'enyi and Tsallis entropies and divergences for exponential families." arXiv preprint arXiv: 1105.3259 (2011). (Year: 2011).*
Bercher, Jean-François. "An amended MaxEnt formulation for deriving Tsallis factors, and associated issues." AIP Conference Proceedings. vol. 872. No. 1. American Institute of Physics, 2006. (Year: 2006).*
Bercher, J-F. "On some entropy functionals derived from Rényi information divergence." Information Sciences 178.12 (2008): 2489-2506. (Year: 2008).*
Nielsen, Frank. "Limits from l'Hôpital rule: Shannon entropy as limit cases of Rényi and Tsallis entropies." (2010). (Year: 2010).*
Crooks, Gavin E., and David A. Sivak. "Measures of trajectory ensemble disparity in nonequilibrium statistical dynamics." Journal of Statistical Mechanics: Theory and Experiment 2011.06 (2011): P06003. (Year: 2011).*
Ho, Siu-Wai, and Sergio Verdú. "Convexity/concavity of Rényi entropy and a-mutual information." 2015 IEEE International Symposium on Information Theory (ISIT). IEEE, 2015. (Year: 2015).*
Dethier, Gérard, et al. "A Grid-enabled Lattice-Boltzmann-based modelling system." International Conference on Parallel Processing and Applied Mathematics. Berlin, Heidelberg: Springer Berlin Heidelberg, 2007. See the abstract and §§ 1.2-1.3 (Year: 2007).*
Schepke, Claudio, Nicolas Maillard, and Philippe OA Navaux. "Parallel lattice boltzmann method with blocked partitioning." International Journal of Parallel Programming 37 (2009): 593-611. See the abstract and §§ 3.2 and 4-4.1. (Year: 2009).*
Wang, Limin, Yilin Fan, and Lingai Luo. "Lattice Boltzmann method for shape optimization of fluid distributor." Computers & Fluids 94 (2014): 49-57. See the abstract and figure 2, and § 4. (Year: 2014).*
Pingen, Georg, Anton Evgrafov, and Kurt Maute. "Topology optimization of flow domains using the lattice Boltzmann method." Structural and Multidisciplinary Optimization 34 (2007): 507-524. See the abstract and figure 18 (Year: 2007).*
Yao, Liankai, Ailan Wang, and Xiaohui Ji. "Parallelism of MRT lattice Boltzmann method based on multi-GPUs." The 7th international conference on computer engineering and networks, Shanghai, China. 2017. See the abstract and §§ 2.1 and 3.2 (Year : 2017).*
Raabe, D. "Overview of the lattice Boltzmann method for nano-and microscale fluid dynamics in materials science and engineering." Modelling and Simulation in Materials Science and Engineering 12.6 (2004): R13. See page R23, ¶¶ 2-3 (Year: 2004).*
Nørgaard, Sebastian, Ole Sigmund, and Boyan Lazarov. "Topology optimization of unsteady flow problems using the lattice Boltzmann method." Journal of Computational Physics 307 (2016): 291-307. See the abstract and § 2.1 (Year: 2016).*

* cited by examiner

METHOD FOR OPTIMALLY SIMULATING FLUID FLOW RESULTS USING TSALLIS OR RENYI DIVERGENCE

PRIORITY STATEMENT

This application claims priority under 35 U.S.C. § 119 to Korean Patent Application No. 10-2018-0101131, Aug. 28, 2018 in the Korean Intellectual Property Office (KIPO), the contents of which are herein incorporated by reference in their entireties.

BACKGROUND

1. Field of Disclosure

The present disclosure of invention relates a method for simulating fluid flow using Tsallis entropy and Rényi entropy, and more specifically the present invention relates to a method for simulating fluid flow using Tsallis entropy and Rényi entropy, for simulating a flow of a fluid including a gas and a liquid more efficiently, more correctly and more stably.

2. Description of Related Technology

As a mathematical equation for simulating fluid flow, Navier-Stokes equation is normally used. Navier-Stokes equation includes the terms of partial derivatives which are the physical quantities such as density, velocity, temperature, pressure and so on of the fluid with respect to time and position.

Thus, as a conventional method for simulating fluid flow, one can discretize Navier-Stokes equation to obtain the solution of the equation approximately. In this case, the calculation domain of the simulation is discretized into an irregular reticular network or a mesh, and a person in charge of the simulation or a user is requested to choose or control various parameters. The user may choose the parameters randomly or control the parameters under given conditions, but in this case, the efficiency, the accuracy and the stability of the simulation may not be guaranteed and this increases the risk of the failure of the simulation. In addition, an optimal value of the parameter may not be selected or may not be recognized in the simulation.

As another mathematical equation for simulating fluid flow, Boltzmann equation is used. In Boltzmann equation, the fluid flow is described by using a probability distribution of a particle with respect to a microscopic velocity of the particle, which is basically different from the macroscopic physical quantities in Navier-Stokes equation.

Regarded prior art on Boltzmann equation is Korean patent No. 10-1562863.

Further, in the fluid flow simulation using Boltzmann equation, a more correct, efficient and stable method is still necessary.

SUMMARY

The present invention is developed to solve the above-mentioned problems of the related arts. The present invention provides a method for simulating fluid flow using Tsallis entropy and Rényi entropy, and more specifically the present invention relates to a method capable of simulating fluid flow using Tsallis entropy and Rényi entropy, for simulating a flow of a fluid including a gas and a liquid more efficiently, more correctly and more stably.

According to an example embodiment, the method includes a space defining step, a state determining step, a flow effect generating step, and a state renewal step. In the space defining step, a simulation space having lattices is defined. In the state determining step, a space occupation state is determined by objects, a fluid state is determined, and a probability distribution state of a particle with respect to a velocity of the particle is determined, for nodes of the lattices of the simulation space. In the flow effect generating step, a flow effect for nodes of the lattices of the simulation space is generated by using a collision rule, as a probability distribution of a particle with respect to a velocity of the particle, which is obtained by satisfying a condition at which Tsallis divergence between the collision rule itself and a reference collision rule which is obtained under a given condition has an extremal value. In the state renewal step, a state of the simulation space is renewed, based on the flow effect generating step.

In an example, the space occupation state of a node in the lattices by the objects may be the state whether the node is in a position where the fluid flows freely or in a position where the fluid is prevented from being flowed by the objects.

In an example, the fluid state may include a density, a pressure, a temperature and a flow velocity of the fluid.

In an example, the flow effect generating step and the state renewal step may be repeated.

In an example, in the space defining step, in the case of the simulation space may be partitioned according to the sizes of the lattices, the distances between neighboring nodes are homogeneous in each partitioned space.

In an example, the lattice node may be arranged with a checkerboard shape in a two-dimensional space, and may be arranged with a jungle gym shape having repeated hexahedrons in a three-dimensional space.

In an example, in the flow effect generating step, the flow effect may be generated by using the collision rule which is obtained by satisfying a condition at which Tsallis divergence between the collision rule itself and a reference collision rule which is obtained under a given condition has an extremal value under a given first constraint.

In an example, the first constraint may include at least one of the conditions among a condition of conservation of mass, a condition of conservation of momentum, a condition of conservation of energy, and a condition of energy transfer velocity.

In an example, concerning for the first constraint, an n-th moment $\mu_{n(a_1,a_2,\ldots,a_d)}$ of a particle velocity vector v with respect to Tsallis distribution $f_T$ may be defined as Equation 6, $$\mu_{n(a_1,a_2,\ldots,a_d)}(u,\theta) = \int_{-\infty}^{\infty} v^n f_T(v,u,\theta) dv \qquad \text{Equation 6,}$$

where, u may be a flow velocity variable, and $\theta$ may be a temperature variable, and in Equation 6, the particle velocity vector to the power of n may be expressed by using the coordinate component $v_{x_i}$, where $i=1, 2, \ldots, d$ for d-dimensional space of the Cartesian coordinate system as Equation 7, $$v^n = v_{x_1}^{a_1} v_{x_2}^{a_2} \cdots v_{x_d}^{a_d} \qquad \text{Equation 7,}$$

where, $a_a$ may be a natural number including 0 when $a=1, 2, \ldots, d$, and $a_1+a_2+\ldots+a_d=n$.

In an example, concerning the first constraint, as for a set of discretized particle velocity $\{v_i | i=1, 2, \ldots, q\}$ having a given number of elements q, an n-th moment $\mu_{n(a_1,a_2,\ldots,a_d)}$ of the discretized particle velocity $v_i$ with respect to a collision rule $r_i$ may be defined as Equation 8, $$\hat{\mu}_{n(a_1, a_2, \ldots, a_d)}(u, \theta) = \sum_{i=1}^{q} v_i^n r_i(u, \theta).$$ Equation 8

In an example, the first constraint may be defined as a combination of mathematical equations selected in y or more equations expressed as Equation 9, $$\hat{\mu}_{j(a_1, a_2, \ldots, a_d)}(u,\theta) = \mu_{j(a_1, a_2, \ldots, a_d)}(u,\theta)$$ Equation 9, where, j=0, 1, . . . , y−1.

In an example, the reference collision rule may be an collision rule $r_i$ satisfying the first constraint under a given reference flow velocity and a given reference temperature, as a probability distribution of a particle with respect to a velocity of the particle, as for a set of discretized particle velocity $\{v_i | i=1, 2, \ldots, q\}$ having a given number of elements q.

According to the present example embodiments, the method includes a space defining step, a state determining step, a flow effect generating step, and a state renewal step. In the space defining step, a simulation space having lattices is defined. In the state determining step, a space occupation state is determined by objects, a fluid state is determined, and a probability distribution state of a particle with respect to a velocity of the particle is determined, for nodes of the lattices of the simulation space. In the flow effect generating step, a flow effect for nodes of the lattices of the simulation space is generated by using a collision rule, as a probability distribution of a particle with respect to a velocity of the particle, which is obtained by satisfying a condition at which Rényi divergence between the collision rule itself and a reference collision rule which is obtained under a given condition has an extremal value. In the state renewal step, a state of the simulation space is renewed, based on the flow effect generating step.

In an example, in the flow effect generating step, the flow effect may be generated by using the collision rule which is obtained by satisfying a condition at which Rényi divergence between the collision rule itself and a reference collision rule which is obtained under a given condition has an extremal value under a given first constraint.

In an example, concerning for the first constraint, an n-th moment $\mu_{n(a_1, a_2, \ldots, a_d)}$ of a particle velocity vector v with respect to Rényi distribution $f_R$ may be defined as Equation 22, $$\mu_{n(a_1, a_2, \ldots, a_d)}(u,\theta) = \int_{-\infty}^{\infty} v^n f_R(v; u, \theta) dv$$ Equation 22, where, u may be a flow velocity variable, and θ may be a temperature variable, and in Equation 22, the particle velocity vector to the power of n may be expressed by using the coordinate component $v_{x_i}$, where i=1, 2, . . . , d for d-dimensional space of the Cartesian coordinate system as Equation 23, $$v^n = v_{x_1}^{a_1} v_{x_2}^{a_2} \ldots v_{x_d}^{a_d}$$ Equation 23, where, $a_a$ may be a natural number including 0 when a=1, 2, . . . , d, and $a_1+a_2+\ldots+a_d=n$.

According to the present example embodiments, when the fluid flow is simulated by using a conventional Boltzmann method, the simulation results are unstable when a flow velocity is faster than a critical value and/or a viscosity of the fluid is lower than a critical value. Thus, the conventional Boltzmann method is applied to relatively limited cases or ranges. However, in the present example embodiment, the above-mentioned problem in the conventional Boltzmann method may be solved and the simulated results may be more corrected and more stable.

In addition, a dynamic equilibrium state or a collision rule can be obtained by using Tsallis entropy, Rényi entropy or other entropies instead of Boltzmann entropy. Thus, in various fluid conditions, the fluid flow may be simulated more correctly and more stably.

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiment of the invention will be explained in detail with reference to the accompanying drawings. In equations used below, a definition of a symbol character is same as the definition thereof in the above, if there is no definition thereof in the equation.

Before explaining methods for simulating fluid flow according to example embodiments of the present invention, several equations which will be used later are defined.

$$\theta = \frac{kT}{m} \quad \text{Equation 1}$$

Here, θ is a temperature variable, k is a Boltzmann constant, T is an absolute temperature, and m is a mass of a particle.

For convenience sake, a reference temperature $T_0$ is defined. It is obvious that $\theta_0$ is obtained by using Equation 1 as $\theta_0=kT_0/m$. Then, non-dimensional variables $\bar{\theta}$, $\bar{v}$ and $\bar{u}$ are defined as $\bar{\theta}=\theta/\theta_0$, $\bar{v}=v/\sqrt{\theta_0}$ and $\bar{u}=u/\sqrt{\theta_0}$. Here, v is a particle velocity, and u is a flow velocity. Hereinafter, Boltzmann constant k is omitted in equations representing entropy. Additional explanations are omitted on that discretized entropy is used in discretized probability distribution, and continuous entropy is used in continuous probability distribution. The entropy equation defined below is expressed based on the discretized entropy, and the continuous entropy equation may be easily derived from the discretized entropy equation and thus may be omitted.

In addition, Rényi entropy for an arbitrary probability distribution $f_i$, and Rényi divergence for two arbitrary probability distributions $f_i$ and $g_i$, are respectively defined as Equation 2 and Equation 3.

$$H_\delta^R(f_i) = \frac{1}{1-\delta}\ln\left(\sum_{i=1}^{q} f_i^\delta\right) \quad \text{Equation 2}$$

$$D_\delta^R(f_i:g_i) = \frac{1}{\delta-1}\ln\left(\sum_{i=1}^{q} \frac{f_i^\delta}{g_i^{\delta-1}}\right) \quad \text{Equation 3}$$

Further, Tsallis entropy for an arbitrary probability distribution $f_i$, and Tsallis divergence for two arbitrary probability distribution $f_i$ and $g_i$, are respectively defined as Equation 4 and Equation 5.

$$H_\delta^T(f_i) = \frac{1}{1-\delta}\ln\left(\sum_{i=1}^{q} f_i^\delta - 1\right) \quad \text{Equation 4}$$

$$D_\delta^T(f_i:g_i) = \frac{1}{\delta-1}\ln\left(\sum_{i=1}^{q} \frac{f_i^\delta}{g_i^{\delta-1}} - 1\right) \quad \text{Equation 5}$$

Here, δ is a parameter. δ is a real number that is not 1, in Tsallis entropy and Tsallis divergence.

Figure 1:
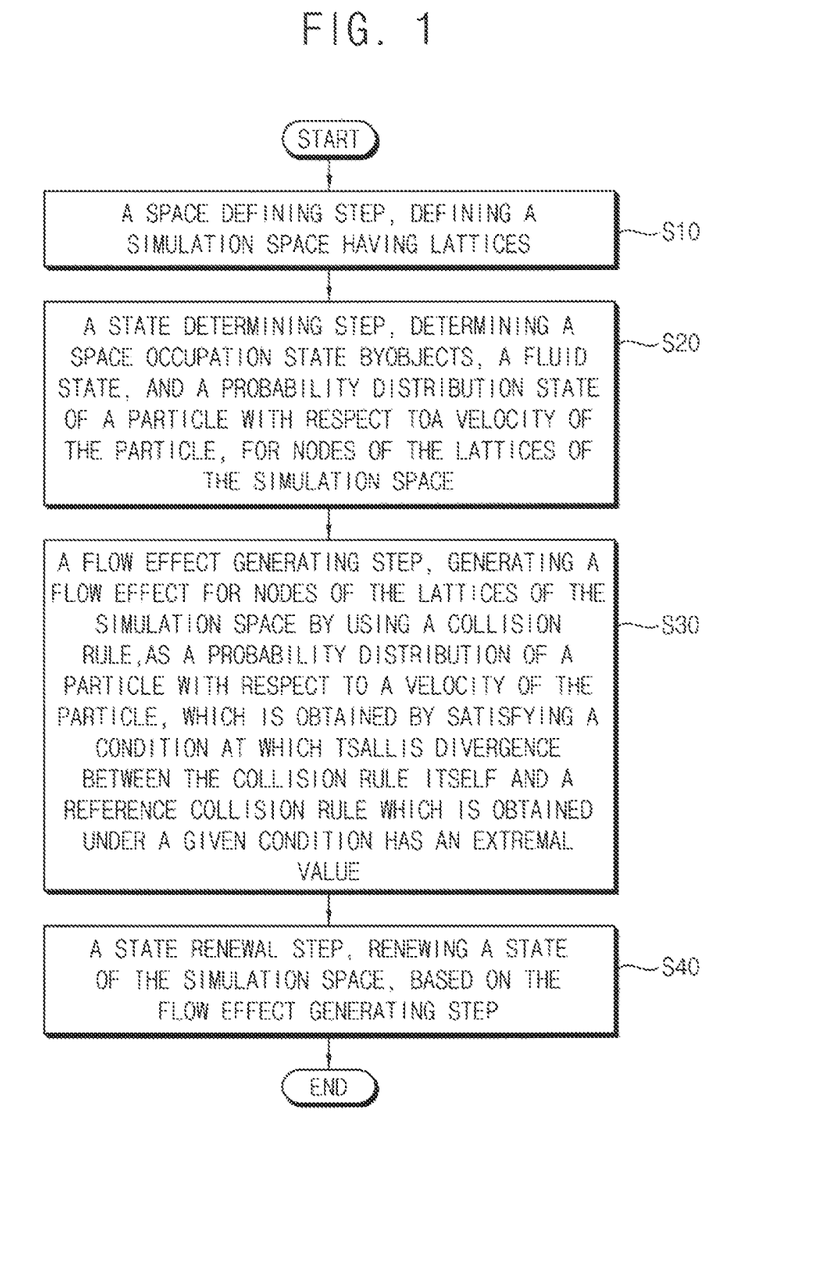
FIG. 1 is a flow chart illustrating a method for simulating fluid flow according to an example embodiment of the present invention.

FIG. 1 is a flow chart illustrating a method for simulating fluid flow according to an example embodiment of the present invention.

Referring to FIG. 1, in the method for simulating fluid flow according to the present example embodiment, firstly, a simulation space having lattices is defined (a space defining step)(step S10).

Here, the simulation space is a space where the method for simulating fluid flow according to the present example embodiment is applied, and the simulation space having the lattices is defined.

For example, the lattice may be obtained by arranging a plurality of lines partially in parallel and partially in crossing. Here, a node is defined as a location where the lines are crossed.

Thus, the simulation space may be partitioned by a plurality of partitioned spaces where each space contains a node. When the nodes are homogeneously distributed, so are the partitioned spaces.

For example, the nodes may be homogeneously arranged to form a checkerboard shape in a two-dimensional space (a plane). Alternatively, the nodes may be homogeneously arranged to form a jungle gym shape having repeated hexahedrons in a three-dimensional space.

Further, the simulation space may be partitioned variously, when the simulation space is partitioned into a plurality spaces having homogeneous area or volume due to homogeneously arranged nodes The simulation space can be partitioned by several lattices. For example, we have a case where a simulation space is partitioned by two lattices. A left-half of the simulation space is filled by nodes which are densely homogeneously distributed so that a lattice is corresponding to the nodes and another right-half of the simulation space is filled by nodes which are sparsely homogeneously distributed so that another lattice is corresponding to the nodes. We define that the size of the lattice for the nodes which are densely distributed is smaller than that for the nodes which are sparsely distributed. We also define that the distances between neighboring nodes in a lattice is homogeneous when the nodes are homogeneously distributed.

After the space defining step, a space occupation state is determined by objects, a fluid state is determined, and a probability distribution state of a particle with respect to a velocity of the particle is determined, for nodes of the lattices of the simulation space (a state determining step) (step S20).

In the present example embodiment, for simulating fluid flow, initial states should be determined on various states in the simulation space, and examples of the initial states, may include a space occupation state by objects, a fluid state, and a probability distribution state of a particle with respect to a velocity of the particle.

Here, the space occupation state by the objects, is the state on whether each node is in a position where the fluid flows freely or in a position where the fluid is prevented from being flowed.

When a node is not occupied by the objects, the fluid freely flows at the node. Alternatively, when a node is occupied by the objects, the fluid is prevented from being flowed at the node, and a level of prevention of the fluid flow is defined as the space occupation state by the objects. For example, in simulating the air flow around a car, the node disposed in a space where the air freely flows around the car is in the state not occupied by the objects, and the node disposed in a space where the car is positioned is in the state occupied by the objects.

In addition, the fluid state is for the characteristics of the fluid, and thus includes a density, a pressure, a temperature, a flow velocity of the fluid, and so on.

In addition, the probability distribution state of a particle with respect to the particle velocity means a probability distribution with respect to a particle velocity satisfying the states of the density, the pressure, the temperature, the flow velocity of the fluid, and so on, in the simulation space.

For example, when a set of particle velocities having four cardinal directions, namely the east, the west, the south and the north directions in two-dimensional and when the flow velocity is zero, in determining the probability distribution with respect to the particle velocity, the probability of existence of the particles having a particle velocity along east direction is coincided with that along west direction, and the probability of existence of the particles having a particle velocity along south direction is coincided with that along north direction, since the flow velocity is obtained by an average of the particle velocity.

Accordingly, the simulation space is defined and the state in the space is determined, and then a flow effect generating step (step S30) is performed.

More specifically, in the flow effect generating step, a flow effect is generated for nodes of the lattices of the simulation space by using a collision rule, as a probability distribution of a particle with respect to a velocity of the particle, which is obtained by satisfying a condition at which Tsallis divergence between the collision rule itself and a reference collision rule which is obtained under a given condition has an extremal value. In other words, Tsallis divergence is calculated based on the reference collision rule and the collision rule, but the collision rule is to be obtained. Thus, with changing the collision rule, Tsallis divergence is calculated, so that the collision rule satisfying the condition at which Tsallis divergence has the extremal value may be obtained. Accordingly, the flow effect is generated using the obtained collision rule.

Here, the flow effect generation, in a point of view that the fluid consists of materials of particles, is realized by the moving of the particles and the collision among the particles in moving. The moving of the particles may be easily performed by moving the particles from a node to another, and the flow effect on the collision among the particles is generated base on the collision rule mentioned above, in the present example embodiment.

For example, the reference collision rule obtained at the given condition, as a probability distribution state of a particle with respect to the particle velocity, means that the probability distribution state with respect to the particle velocity satisfying a given first constraint under a given reference flow velocity and a given reference temperature. Further, the collision rule which is to be obtained, satisfies the given first constraint.

Here, the first constraint may be at least one of the conditions among a condition of conservation of mass, a condition of conservation of momentum, a condition of conservation of energy, and a condition of energy transfer velocity.

More specifically, concerning for the first constraint, an n-th moment ($\mu_{n(a_1,a_2,\ldots,a_d)}$) of a particle velocity vector v with respect to Tsallis distribution $f_T$ is defined as Equation 6, $$\mu_{n(a_1,a_2,\ldots,a_d)}(u,\theta)=\int_{-\infty}^{\infty} v^n f_T(v,u,\theta)dv \quad \text{Equation 6}$$

where, u is a flow velocity variable, and $\theta$ is a temperature variable.

In Equation 6, the particle velocity vector to the power of n is expressed by using the coordinate component $v_{x_i}$, where i=1, 2, ..., d for d-dimensional space of the Cartesian coordinate system as Equation 7, $$v^n = v_{x_1}^{a_1} v_{x_2}^{a_2} \ldots v_{x_d}^{a_d} \quad \text{Equation 7}$$

where, $a_a$ is a natural number including 0 when a=1, 2, ..., d, and $a_1+a_2+\ldots+a_d=n$.

In addition, concerning the first constraint, as for a set of discretized particle velocity $\{v_i | i=1, 2, \ldots, q\}$ having a given number of elements q, an n-th moment $\hat{\mu}_{n(a_1,a_2,\ldots,a_d)}$ of the discretized particle velocity $v_i$ with respect to the collision rule $r_i$ is defined as Equation 8, $$\hat{\mu}_{n(a_1,a_2,\ldots,a_d)}(u,\theta) = \sum_{i=1}^{q} v_i^n r_i(u,\theta) \quad \text{Equation 8}$$

The first constraint is defined as a combination of mathematical equations selected in y or more equations expressed as Equation 9, $$\hat{\mu}_{j(a_1,a_2,\ldots,a_d)}(u,\theta)=\mu_{j(a_1,a_2,\ldots,a_d)}(u,\theta) \quad \text{Equation 9}$$

where, j=0, 1, ..., y−1.

Accordingly, when the first constraint is defined, for example, the given reference flow velocity and the given reference temperature are determined as $u_0$ and $\theta_0$, respectively, the reference collision rule may be obtained by solving the probability distribution state of a particle satisfying the first constraint with fixing the flow velocity variable u to $u_0$, and fixing the temperature variable $\theta$ to $\theta_0$, in Equation 9.

Accordingly, in the flow effect generating step, the flow effect is generated, using the collision rule satisfying the condition at which Tsallis divergence has the extremal value, and Tsallis divergence is calculated between the reference collision rule and the collision rule, with changing the collision rule. Thus, the collision rule $r_i$ may be obtained to generate the flow effect. In addition, the collision rule satisfies the given first constraint.

Further, the collision rule generating the flow effect is obtained, and a simulation method using the collision rule is explained below in detail.

As mentioned above, to obtain the equilibrium probability distribution of the particle, the collision rule $r_i$ with respect to the discretized particle velocity $v_i$, firstly, n-th moment of the discretized particle velocity vector $v_i$ is defined as in Equation 8.

Here, when $r_i$ with $\bar{u}=0$, $\bar{\theta}=1$ is defined as $g_i$, Equation 8 is expressed to Equation 10.

$$\hat{\mu}_{n(a_1,a_2,\ldots,a_d)}(0,\theta_0) = \sum_{i=1}^{q} v_i^n g_i \quad \text{Equation 10}$$

Here, before solving the equilibrium probability distribution $r_i$, the condition equations of the number of s, which are necessary for solving unknown values $v_i$ and $g_i$, are determined as Equation 11, and Equation 11 is solved.

$$\mu_{n(a_1,a_2,\ldots,a_d)}(0,\theta)=\hat{\mu}_{n(a_1,a_2,\ldots,a_d)}(0,\theta) \quad \text{Equation 11}$$

In Equation 11, to generate condition equations of the number of s, the combinations of $a_i$ for i=1, ..., d are chosen by the following way: it is preferred that relatively smaller natural numbers are to be chosen, and the number of s of the condition equations may be changed according to the definition of the particle velocity set.

Lagrangian L is defined as Equation 12 and Equation 13, and in Equations 12 and 13, $\lambda_i$ of the number of y is Lagrange multipliers. Here, j=0, 1, ..., y−1.

Here, one of Equations 12 and 13 may be chosen, and $\delta$ in Equations 12 and 13 is a parameter and may be defined as a single value, or as a limit value.

$$L = D_\delta^R(r_i : g_i) +$$
$$\sum_{j=0}^{\gamma-1} \lambda_{j(a_1,a_2,\ldots,a_d)} \left( \hat{\mu}_{j(a_1,a_2,\ldots,a_d)}(u,\theta) - \mu_{j(a_1,a_2,\ldots,a_d)}(u,\theta) \right)$$

Equation 12

$$L = D_\delta^T(r_i : g_i) +$$
$$\sum_{j=0}^{\gamma-1} \lambda_{j(a_1,a_2,\ldots,a_d)} \left( \hat{\mu}_{j(a_1,a_2,\ldots,a_d)}(u,\theta) - \mu_{j(a_1,a_2,\ldots,a_d)}(u,\theta) \right)$$

Equation 13

Thus, from one of Equations 12 and 13, the condition equations in which Lagrangian L has an extremal value may be obtained as Equation 14, and here, i=1, 2, . . . , q.

$$\frac{\partial L}{\partial r_i} = 0$$

Equation 14

Thus, based on the equations above and the first constraint, $r_i$ may be obtained. Here, $r_i$ may be approximately obtained, if $r_i$ is not obtained analytically.

In the method for simulating fluid flow according to the example embodiment, when the flow effect is generated, the discretized particle distribution $f_i$ with respect to the discretized particle velocity $v_i$ is obtained at each node, and thus the fluid flow may be simulated.

When the simulation space defined in the space defining step (step S10) is discretized with an homogeneous lattice, a distance between the nodes closest adjacent to each other is defined as $\Delta x$.

In addition, in the state determining step (step S20), the density $\rho$, the flow velocity u and the temperature T of the fluid are provided at each node, and then $f_i$ is obtained at an arbitrary position x and time t, using Equation 15 below.

$$f_i(x,t) = \rho(x,t) r_i(x,t) = \rho(x,t) r_i(u(x,t), T(x,t))$$

Equation 15

Here, $r_i$ is a function of the variables u and T, but the variables are determined if the position x and the time t are provided, and thus $r_i$ may be expressed as $r_i(x, t)$. The initial value is defined as $f_i(x, t_0)$, when $t=t_0$.

The discrete time $\Delta t$ is obtained from $\Delta x$ and $v_{min}$ where $v_{min}$ is chosen by an element of the discrete velocity set. The element should satisfy that it is the smallest velocity which is non-zero and positive, as Equation 16.

$$\Delta t = \Delta x / v_{min}$$

Equation 16

Thus, $f_i^{eq}$ is obtained using Equation 17, and in Equation 17 $f_i(x, t_0)$ is provided as $f_i^{eq}(x, t_0)$.

$$f_i^{eq}(x,t) = \rho(x,t) r_i(x,t)$$

Equation 17

In addition, Equation 18 is repeatedly applied to every node at each time step $\Delta t$, physical quantities at the position x and the time t are obtained via Equations 19 to 21.

Here, $\omega$ is a parameter determining a viscosity of the fluid.

$$f_i(x + \Delta x, t + \Delta t) = (1 - \omega) f_i(x,t) + \omega f_i^{eq}(x,t)$$

Equation 18

$$\rho(x,t) = \sum_{i=1}^{q} f_i(x,t)$$

Equation 19

$$\rho(x,t) u(x,t) = \sum_{i=1}^{q} v_i f_i(x,t)$$

Equation 20

$$\rho(x,t) T(x,t) = \sum_{i=1}^{q} (v_i - u)^2 f_i(x,t)$$

Equation 21

$f_i^{eq}$ for two-dimensional and three-dimensional spaces may be obtained by a tensor product of $f_i^{eq}$ for one-dimensional space. Note that d is the number of space dimension.

Then, the flow effect is generated as mentioned above, the state of the simulation space is renewed based on the generated flow effect (a state renewal step)(step S40).

Further, the flow effect generating step (step S30) and the state renewal step (step S40) are repeated, to simulate the change of the fluid flow over time. Here, the repetition of step S30 and step S40 means that the time taken from the initial time of the initial state is accumulated by $\Delta t$.

As an example method for simulating fluid flow according to the present example embodiment, a simulation model, in one-dimensional space by using Tsallis divergence with the number of the elements of a velocity set being 3 and the number of the Lagrange multiplier being 2, is explained below.

Here, a multi-dimensional model may be obtained using the tensor product, based on the model explained below.

The discrete particle velocity set having the number of the elements of 3 is defined below.

$v_1 = 0$, and $v_2 = -v_3$

Here, to obtain $v_i$ and $g_i$, the solutions satisfying the below equations may be obtained.

$\hat{\mu}_0(0,\theta_0)=1$ $\hat{\mu}_1(0,\theta_0)=0$ $\hat{\mu}_2(0,\theta_0)=\theta_0$ $\hat{\mu}_3(0,\theta_0)=0$ $\hat{\mu}_4(0,\theta_0)=3\theta_0^2$ Thus, the solutions are obtained as follows.

$g_1 = 2/3, g_2 = 1/6, g_3 = 1/6$ $v_2 = \sqrt{3\theta_0}$

Thus, Lagrangian L may be defined as follows, using Tsallis divergence.

$$L = \frac{1}{\delta - 1} \left( \sum_{i=1}^{q} \frac{r_i^\delta}{g_i^{\delta-1}} - 1 \right) + \lambda_0 \left( \sum_{i=1}^{q} r_i - 1 \right) + \lambda_1 \left( \sum_{i=1}^{q} v_i r_i - u \right)$$

For Lagrangian L to have the extremal value, $r_i$ satisfying the following condition is obtained.

$$\frac{\partial L}{\partial r_i} = 0$$

Thus, $r_i$ satisfies the following equation.

$$2 \left( \frac{r_1}{g_1} \right)^{\delta-1} = \left( \frac{r_2}{g_2} \right)^{\delta-1} + \left( \frac{r_3}{g_3} \right)^{\delta-1}$$

-continued $$r_1 + r_2 + r_3 = 1$$

$$r_2 - r_3 = \frac{\bar{u}}{\sqrt{3}}$$

Using the above equation, $r_3$ is obtained as follows and $r_1$ and $r_2$ are easily derived from the above equations by using the following equation.

$$r_3 = \frac{1}{13440}(816\delta^7 - 11453\delta^6 + 10458\delta^5 - 39497\delta^4 - 84736\delta^3 - 103630\delta^2 + 67208\delta - 179900)u^8 - 56(16\delta^5 - 190\delta^4 + 845\delta^3 - 1760\delta^2 + 1724\delta - 640)u^6 + 560(2\delta^3 - 13\delta^2 + 26\delta - 16)u^4 - 2240(\delta - 2)u^2 - 2240\sqrt{3}u + 2240$$

Accordingly, using the method for simulating fluid flow according to the present example embodiment, the equilibrium probability distribution $r_i$ which is the collision rule is obtained, and thus the discretized particle distribution $f_i$ is obtained.

Concerning the discrete particle velocity set having the number of the elements of 5, where the discrete velocities are defined by satisfying $v_1=0$, $v_2=-v_3$, $v_4=-v_5$, and $v_4=3v_2$, the collision rule in which Tsallis divergence has the extremal value is obtained as an example. The following results partially show the collision rule of the above case.

$$r_2 = \sum_{i=0}^{25} c_{2,i} \bar{u}^i$$

$$r_3 = \sum_{i=0}^{25} (-1)^i c_{2,i} \bar{u}^i$$

Figure 2:
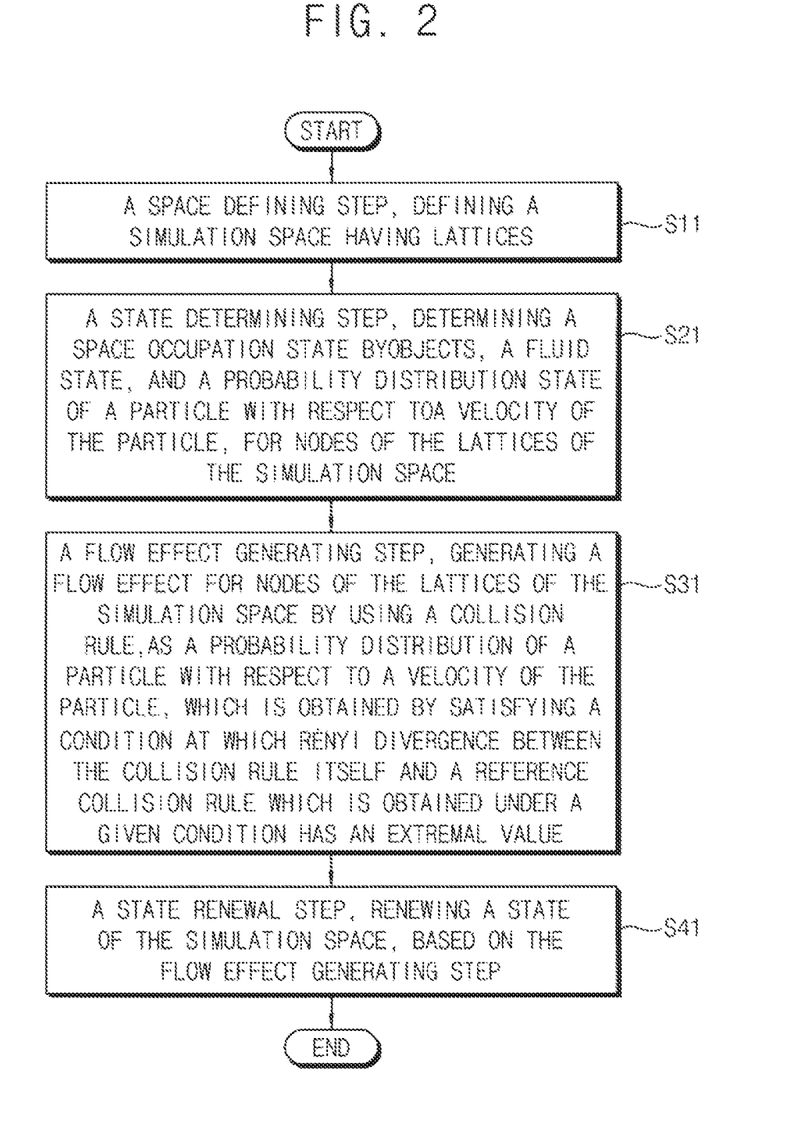
FIG. 2 is a flow chart illustrating a method for simulating fluid flow according to another example embodiment of the present invention.

$c_{2,0} = 0.418585$ $c_{2,1} = 0.327615$ $c_{2,2} = -0.0810854$ $c_{2,3} = -0.130359$ $c_{2,4} = -0.00523576$ $c_{2,5} = 0.0252523$ $c_{2,6} = 0.00416667$ $c_{2,7} = -0.00163056$ $c_{2,8} = -0.00133483$ $c_{2,9} = -0.00183544$ $c_{2,10} = 0.000143909$ $c_{2,11} = 0.00111392$ $c_{2,12} = 0.000115384$ $c_{2,13} = -0.000306767$ $c_{2,14} = -0.0000849446$ $c_{2,15} = -0.0000169949$ $c_{2,16} = 0.000027374$ $c_{2,17} = 0.0000639005$ $c_{2,18} = -1.0714632379328269 \times 10^{-7}$ $c_{2,19} = -0.0000335876$ $c_{2,20} = -5.167043046335029 \times 10^{-6}$ $c_{2,21} = 7.266726976882714 \times 10^{-6}$ -continued $c_{2,22} = 3.078105021814851 \times 10^{-6}$ $c_{2,23} = 2.4170487650194374 \times 10^{-6}$ $c_{2,24} = -7.92450804172541 \times 10^{-7}$ $c_{2,25} = -2.952120763739071 \times 10^{-6}$ FIG. 2 is a flow chart illustrating a method for simulating fluid flow according to another example embodiment of the present invention.

The method for simulating fluid flow according to the present example embodiment, is substantially the same as the method in the previous example embodiment of FIG. 1, except for a flow effect generating step, and thus any repetitive explanation will be omitted.

In the present example embodiment, a space defining step (step S11), a state determining step (step S21) and a state renewal step (step S41) are substantially the same as the space defining step (step S10), the state determining step (step S20) and the state renewal step (step S40), respectively.

In addition, referring to FIG. 2, the flow effect generating step (step S31) in the present example embodiment, is substantially the same as the flow effect generating step (step S30) in the previous example embodiment, except for satisfying a condition at which Rényi divergence has an extremal value.

Accordingly, in the flow effect generating step (step S31), a flow effect is generated for nodes of the lattices of the simulation space by using a collision rule, as a probability distribution of a particle with respect to a velocity of the particle, which is obtained by satisfying a condition at which Rényi divergence between the collision rule itself and a reference collision rule which is obtained under a given condition has an extremal value. In other words, Rényi divergence is calculated based on the reference collision rule and the collision rule, but the collision rule is to be obtained. Thus, with changing the collision rule, Rényi divergence is calculated, so that the collision rule satisfying the condition at which Rényi divergence has the extremal value may be obtained. Accordingly, the flow effect is generated using the obtained collision rule.

Accordingly, the flow effect is generated by using the collision rule which is obtained by satisfying a condition at which Rényi divergence between the collision rule itself and a reference collision rule which is obtained under a given condition has an extremal value under a given first constraint.

Here, as for the first constraint, an n-th moment $\mu_{n(a_1, a_2, \ldots, a_d)}$ of a particle velocity vector v with respect to Rényi distribution $f_R$ is defined as Equation 22, $$\mu_{n(a_1, a_2, \ldots, a_d)}(u, \theta) = \int_{-\infty}^{\infty} v^n f_R(v, u, \theta) dv \quad \text{Equation 22,}$$

where, u is a flow velocity variable, and $\theta$ is a temperature variable,

In Equation 22, the particle velocity vector to the power of n is expressed by using the coordinate component $v_{x_i}$, where $i=1, 2, \ldots, d$ for d-dimensional space of the Cartesian coordinate system as Equation 23, $$v^n = v_{x_1}^{a_1} v_{x_2}^{a_2} \ldots v_{x_d}^{a_d} \quad \text{Equation 23,}$$

where, $a_a$ a is a natural number including 0 when $a=1, 2, \ldots, d$, and $a_1 + a_2 + \ldots + a_d = n$.

In the flow effect generating step (step S31), Equations 22 and 23 concerning the first constraint, is substitute for Equations 6 and 7 concerning the first constraint in the flow effect generating step (step S30) in FIG. 1.

In FIG. 1, the flow effect is generated based on the collision rule satisfying the condition at which Tsallis divergence has an extremal value, but in the present example embodiment, the flow effect is generated based on the collision rule satisfying the condition at which Rényi divergence has an extremal value.

The equations related to other steps and other simulation methods in the present example embodiment are substantially the same as the equations already mentioned or explained referring to FIG. 1, and thus any repetitive explanation will be omitted.

FIG. 3, FIG. 4, FIG. 5 and FIG. 6 are graphs illustrating enhanced results of the method of simulating fluid flow of the present example embodiments in comparison to the conventional methods.

A shock wave test is a conventional benchmark method for comparing stability of the methods for simulating fluid flow, and FIG. 3, FIG. 4, FIG. 5 and FIG. 6 are the results of the shock wave test for the method according to the present example embodiments and the results of the method for comparison.

In the shock wave test, when a block dividing two spaces having pressures different from each other is rapidly removed, the shock wave transmitting from the space having a relatively high pressure toward the space having a relatively low pressure is tested. In the shock wave test for the method in the present example embodiments, each of the spaces is assumed to be a one-dimensional space, and a length of each space is assumed to be 500Δx.

Figure 3:
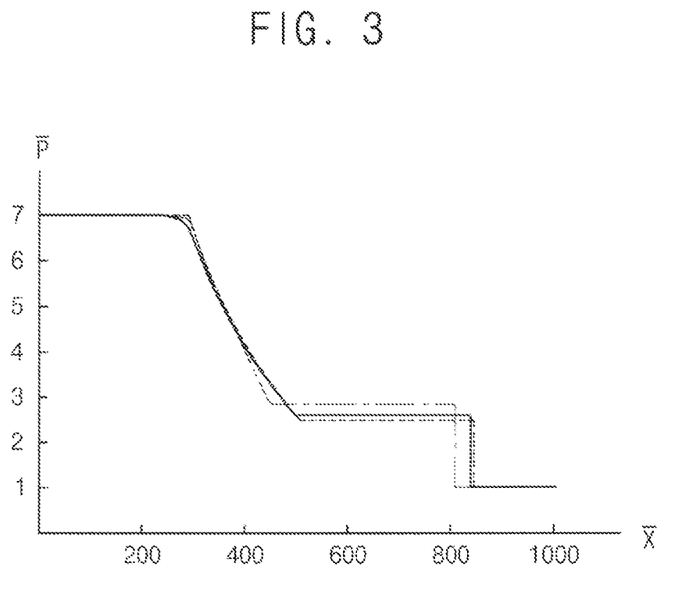
FIG. 3, FIG. 4, FIG. 5 and FIG. 6 are graphs illustrating enhanced results of the method of simulating fluid flow of the present example embodiments in comparison to the conventional methods.

Referring to FIG. 3, when the pressures of the spaces are 7 and 1, respectively, the pressure distribution after 164Δt time is showed. Here, a horizontal axis is in a range between 0 and 1,000 and each space is 500Δx and total space is 1,000Δx, and thus the horizontal axis is the axis representing the position omitting Δx. A vertical axis means a relative pressure expressed with respect to the lowest pressure in the simulation space. In addition, at the initial of the simulation, the block dividing two spaces are assumed to be rapidly removed. Further, the simulation result obtained from the present example embodiments is expressed with a full line, and the result from the conventional method is expressed with a dashed dotted line, with the same experimental conditions.

Riemann solution is an analytic result and is expressed with a dashed line, and the value of the range of the horizontal line of the Riemann solution graph is compared to that of the simulation results, so that accuracy of the simulation result may be evaluated.

Referring to FIG. 3 again, the simulation results in the present example embodiment are more accurate than those in the conventional method.

Figure 4:
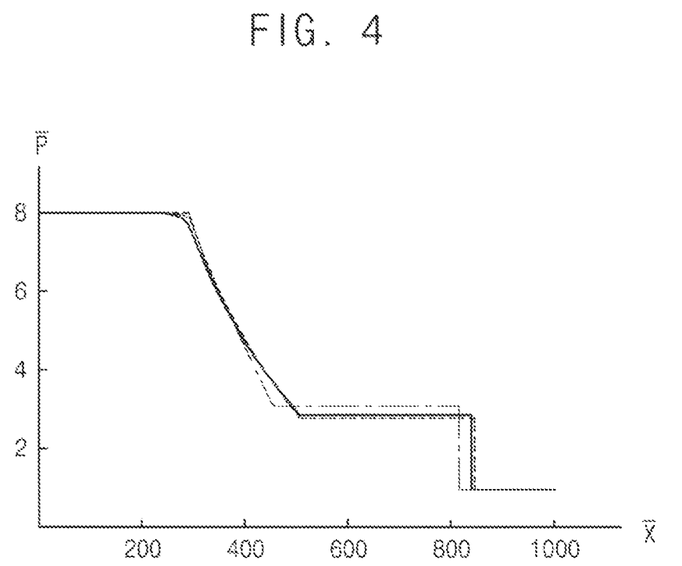
Figure 5:
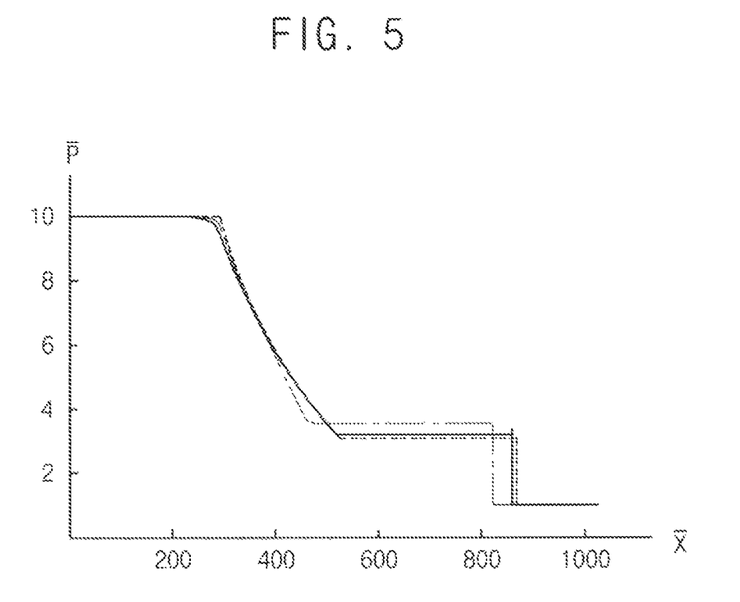
Figure 6:
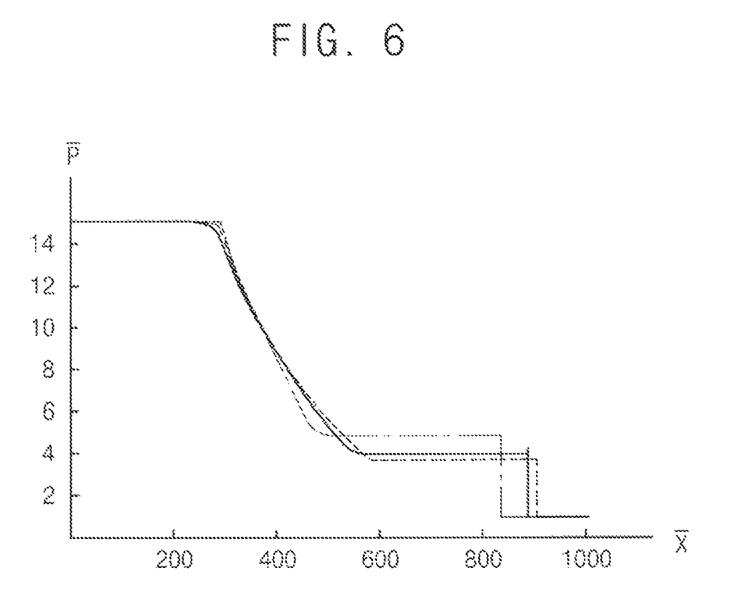

FIG. 4, FIG. 5 and FIG. 6 are graphs illustrating the pressure distribution after 164Δt time, when the pressures of two spaces are 8 and 1, 10 and 1, and 15 and 1, respectively.

Referring to FIG. 4, FIG. 5 and FIG. 6, as in FIG. 3, the simulation results in the present example embodiment are more accurate than those in the conventional method.

According to the present example embodiments, when the fluid flow is simulated by using a conventional Boltzmann method, the simulation results are unstable when a flow velocity is faster than a critical value and/or a viscosity of the fluid is lower than a critical value. Thus, the conventional Boltzmann method is applied to a relatively limited cases or ranges. However, in the present example embodiment, the above-mentioned problem in the conventional Boltzmann method may be solved and the simulated results may be more accurate and more stable.

In addition, a dynamic equilibrium state or a collision rule can be obtained by using Tsallis entropy, Rényi entropy or other entropies instead of Boltzmann entropy. Thus, in various fluid conditions, the fluid flow may be simulated more accurately and more stably.

In the present example embodiments mentioned above, even though the font of a word or a symbol in the equations or the explanations is expressed differently, the word or the symbol should be understood with same meaning. For example, the particle velocity vector v which is expressed as an italic font, should be interpreted with same meaning as 'v'.

Having described the example embodiments of the present invention and its advantage, it is noted that various changes, substitutions and alterations can be made herein without departing from the spirit and scope of the invention as defined by appended claims.

What is claimed is:

1. A method for optimally simulating real fluid flow around a real object using Tsallis divergence, comprising:
    (i) by considering the real object, defining a simulation space having a plurality of lattices characterized by respective nodes, wherein, when an initial simulation space is partitioned by a plurality of partitioned spaces according to sizes of the plurality of lattices, neighboring nodes have distances therebetween which are homogeneous in each partitioned space, wherein at least one lattice of the plurality of lattices has a smaller size, and the nodes of the at least one lattice are more densely distributed than sparsely distributed nodes of other lattices of the plurality of lattices;
    (ii) transferring the shape of the real object to the simulation space by setting a space occupation state onto the respective nodes of the plurality of lattices of the simulation space;
    (iii) modeling a fluid state by characteristics of a real fluid including density, pressure, temperature, and flow velocity of the fluid for the respective nodes of the plurality of lattices of the simulation space;
    (iv) setting states including a probability distribution state of a particle with respect to velocity of the particle for the respective nodes of the plurality of lattices of the simulation space;
    (v) simulating real fluid flow by generating a flow effect for the respective nodes of the plurality of lattices of the simulation space by using a collision rule, which is based on a probability distribution of the particle with respect to the velocity of the particle; the collision rule being obtained by satisfying a condition at which the Tsallis divergence between the collision rule itself and a reference collision rule has an extremal value under a given constraint to generate a simulated fluid flow result;
    (vi) renewing the states based on the simulated fluid flow result; and
    (vii) modeling, based on steps (i)-(vi), fluid flow around the real object.

2. The method of claim 1, wherein the space occupation state of a respective node in each lattice of the plurality of lattices by the objects is the state determined by whether the node is in a position where the fluid flows freely or in a position where the fluid is prevented from flowing by the objects.

3. The method of claim 2, wherein the fluid state is a gas, a liquid, or a combination thereof and has properties including a density, a pressure, a temperature and a flow velocity of the fluid.

4. The method of claim 2, wherein,
the collision rule is obtained by satisfying a condition at which the Tsallis divergence between the collision rule itself and a reference collision rule has an extremal value under a given first constraint,
wherein the first constraint comprises a condition selected from the group consisting of conservation of mass, conservation of momentum, conservation of energy, and energy transfer velocity, and
wherein, for the first constraint,
an n-th moment $\mu_{n(a_1,a_2,\ldots,a_d)}$ of a particle velocity vector v with respect to Tsallis distribution $f_T$ is defined as Equation 6 below, $$\mu_{n(a_1,a_2,\ldots,a_d)}(u,\theta) = \int_{-\infty}^{\infty} v^n f_T(v,u,\theta)\,dv \qquad \text{Equation 6,}$$

where u is a flow velocity variable and θ is a temperature variable, and in Equation 6, the particle velocity vector to the power of n is expressed by using the coordinate component $v_{x_i}$ where i=1, 2, ..., d for d-dimensional space of the Cartesian coordinate system as Equation 7 below, $$v^n = v_{x_1}^{a_1} v_{x_2}^{a_2} \ldots v_{x_d}^{a_d} \qquad \text{Equation 7,}$$

where $a_a$ is a natural number including 0 when a=1, 2, ..., d, and $a_1 + a_2 + \ldots + a_d = n$.

5. The method of claim 1, wherein renewing the state of the simulation space and generating the flow effect are repeated until an optimal simulated fluid flow result is obtained.

6. The method of claim 1, wherein the collision rule which is obtained under a given condition has an extremal value under a given first constraint,
wherein the first constraint comprises a condition selected from the group consisting of conservation of mass, conservation of momentum, conservation of energy, and energy transfer velocity;
and wherein the first constraint has a set of discretized particle velocity $\{v_i | i=1, 2, \ldots, q\}$ having a given number of elements q and an n-th moment $\hat{\mu}_{n(a_1,a_2,\ldots,a_d)}$ of the discretized particle velocity $v_i$ with respect to a collision rule $r_i$, where $a_a$ is a natural number including 0 when a=1, 2, ..., d, and $a_1 + a_2 + \ldots + a_d = n$, and i is an element of the given number of elements q.

7. The method of claim 6, wherein the first constraint is defined as a combination of mathematical equations selected in two or more equations expressed as Equation 9 below, $$\hat{\mu}_{j(a_1,a_2,\ldots,a_d)}(u,\theta) = \mu_{j(a_1,a_2,\ldots,a_d)}(u,\theta) \qquad \text{Equation 9,}$$

where, j=0, 1, ..., y−1, and
where u is a flow velocity variable, θ is a temperature variable, $\hat{\mu}_j$ is a j-th moment of the discretized particle velocity $v_i$ with respect to a collision rule $r_i$, and $\mu_j$ is a j-th moment of a particle velocity with respect to Tsallis distribution $f_T$, wherein y represents of a number of equations in the two or more equations.

8. The method of claim 1, wherein the reference collision rule is a collision rule $r_i$ satisfying the first constraint under a given reference flow velocity and a given reference temperature, as a probability distribution of a particle with respect to a velocity of the particle, and for a set of discretized particle velocity $\{v_i | i=1, 2, \ldots, q\}$ having a given number of elements q; where i is an element of the given number of elements q.

9. The method of claim 1, wherein to optimally simulate a fluid flow result,
the Tsallis divergence between a probability distribution f, and another probability distribution g, is defined as Equation 5 below, $$D_\delta^T(f_i;g_i) = \frac{1}{\delta - 1}\left(\sum_{i=1}^q \frac{f_i^\delta}{g_i^{\delta-1}} - 1\right) \qquad \text{Equation 5}$$

where δ is a parameter which is a real number that is not 1, and q is the number of the elements of the set of discretized particle velocity, and $f_i$ is related to the collision rule itself which is defined by a symbol $r_i$, and $g_i$ is related to the reference collision rule; and wherein i is an element of the given number of elements q.

10. A method for optimally simulating real fluid flow around a real object using Renyi divergence, comprising:
(i) by considering the real object, defining a simulation space having a plurality of lattices characterized by respective nodes, wherein, when an initial simulation space is partitioned by a plurality of partitioned spaces according to sizes of the plurality of lattices, neighboring nodes have distances therebetween which are homogeneous in each partitioned space, wherein at least one lattice of the plurality of lattices has a smaller size, and the nodes of the at least one lattice are more densely distributed than sparsely distributed nodes of other lattices of the plurality of lattices;
(ii) transferring the shape of the real object to the simulation space by setting a space occupation state onto the respective nodes of the plurality of lattices of the simulation space;
(iii) modeling a fluid state by characteristics of a real fluid including density, pressure, temperature, and flow velocity of the fluid for the respective nodes of the plurality of lattices of the simulation space;
(iv) setting states including a probability distribution state of a particle with respect to velocity of the particle for the respective nodes of the plurality of lattices of the simulation space;
(v) simulating real fluid flow by generating a flow effect for the respective nodes of the plurality of lattices of the simulation space by using a collision rule, which is based on a probability distribution of the particle with respect to the velocity of the particle; the collision rule being obtained by satisfying a condition at which the Renyi divergence between the collision rule itself and a reference collision rule has an extremal value under a given constraint to generate a simulated fluid flow result;
(vi) renewing the states based on the simulated fluid flow result; and
(vii) modeling, based on steps (i)-(vi), fluid flow around the real object.

11. The method of claim 10, wherein to optimally simulate a fluid flow result,
the Rényi divergence between a probability distribution $f_i$ and another probability distribution $g_i$ is defined as Equation 3 below, $$D_\delta^R(f_i;g_i) = \frac{1}{\delta - 1}\ln\left(\sum_{i=1}^q \frac{f_i^\delta}{g_i^{\delta-1}}\right) \qquad \text{Equation 3}$$

where δ is a parameter which is a real number that is not 1, and q is the number of the elements of the set of discretized particle velocity, and $f_i$ is related to the collision rule itself which is defined by a symbol $r_i$, and $g_i$ is related to the reference collision rule.

12. The method of claim 10, wherein
the collision rule is obtained by satisfying a condition at which the Rényi divergence between the collision rule itself and a reference collision rule has an extremal value under a given first constraint,
wherein the first constraint comprises a condition selected from the group consisting of conservation of mass, conservation of momentum, conservation of energy, and energy transfer velocity, and
wherein for the first constraint,
an n-th moment $\mu_{n(a_1, a_2, \ldots, a_d)}$ of a particle velocity vector v with respect to Rényi distribution $f_R$ is defined as Equation 22 below, $$\mu_{n(a_1, a_2, \ldots, a_d)}(u,\theta) = \int_{-\infty}^{\infty} v^n f_R(v, u, \theta) dv \quad \text{Equation 22,}$$

where, u is a flow velocity variable, and $\theta$ is a temperature variable,
and
in Equation 22, the particle velocity vector to the power of n is expressed by using the coordinate component $v_{x_i}$, where $i=1, 2, \ldots, d$ for d-dimensional space of the Cartesian coordinate system as Equation 23 below, $$v^n = v_{x_1}^{a_1} v_{x_2}^{a_2} \ldots v_{x_d}^{a_d} \quad \text{Equation 23,}$$

where $a_a$ is a natural number including 0 when $a=1, 2, \ldots, d$, and $a_1 + a_2 + \ldots + a_d = n$.

13. A method for optimally simulating real fluid flow around a real object using Tsallis divergence, comprising:
(i) by considering the real object, defining a simulation space having a plurality of lattices characterized by respective nodes, wherein, when an initial simulation space is partitioned by a plurality of partitioned spaces according to sizes of the plurality of lattices, neighboring nodes have distances therebetween which are homogeneous in each partitioned space, wherein at least one lattice of the plurality of lattices has a smaller size, and the nodes of the at least one lattice are more densely distributed than sparsely distributed nodes of other lattices of the plurality of lattices;
(ii) transferring the shape of the real object to the simulation space by setting a space occupation state onto the respective nodes of the plurality of lattices of the simulation space;
(iii) modeling a fluid state by characteristics of a real fluid including density, pressure, temperature, and flow velocity of the fluid for the respective nodes of the plurality of lattices of the simulation space;
(iv) setting states including a probability distribution state of a particle with respect to velocity of the particle for the respective nodes of the plurality of lattices of the simulation space;
(v) simulating real fluid flow by generating a flow effect for the respective nodes of the plurality of lattices of the simulation space by using a collision rule, which is based on a probability distribution of the particle with respect to the velocity of the particle; the collision rule being obtained by satisfying a condition at which the sum of (1) and (2) has an extremal value to generate a simulated fluid flow result:
  (1) the Tsallis divergence between the collision rule itself and a reference collision rule and
  (2) sum of Lagrange multipliers times a difference between a discretized n-th moment and an n-th moment of a particle velocity vector with respect to the Tsallis distribution where n runs from 0 to a given positive integer for the sum;
(vi) renewing the states based on the simulated fluid flow result; and
(vii) modeling, based on steps (i)-(vi), fluid flow around the real object.

14. A method for optimally simulating real fluid flow around a real object using Rényi divergence, comprising:
(i) by considering the real object, defining a simulation space having a plurality of lattices characterized by respective nodes, wherein, when an initial simulation space is partitioned by a plurality of partitioned spaces according to sizes of the plurality of lattices, neighboring nodes have distances therebetween which are homogeneous in each partitioned space, wherein at least one lattice of the plurality of lattices has a smaller size, and the nodes of the at least one lattice are more densely distributed than sparsely distributed nodes of other lattices of the plurality of lattices;
(ii) transferring the shape of the real object to the simulation space by setting a space occupation state onto the respective nodes of the plurality of lattices of the simulation space;
(iii) modeling a fluid state by characteristics of a real fluid including density, pressure, temperature, and flow velocity of the fluid for the respective nodes of the plurality of lattices of the simulation space;
(iv) setting states including a probability distribution state of a particle with respect to velocity of the particle for the respective nodes of the plurality of lattices of the simulation space;
(v) simulating real fluid flow by generating a flow effect for the respective nodes of the plurality of lattices of the simulation space by using a collision rule, which is based on a probability distribution of the particle with respect to the velocity of the particle; the collision rule being obtained by satisfying a condition at which the sum of (1) and (2) has an extremal value to generate a simulated fluid flow result:
  (1) the Rényi divergence between the collision rule itself and a reference collision rule and
  (2) sum of Lagrange multipliers times a difference between a discretized n-th moment and an n-th moment of a particle velocity vector with respect to the Rényi distribution where n runs from 0 to a given positive integer for the sum;
(vi) renewing the states based on the simulated fluid flow result; and
(vii) modeling, based on steps (i)-(vi), fluid flow around the real object.

15. A method for correctly, efficiently, and stably generating flow effect around a real object, comprising:
(i) by considering the real object, defining a simulation space having a plurality of lattices characterized by respective nodes, wherein, when an initial simulation space is partitioned according to sizes of the plurality of lattices, neighboring nodes have distances therebetween which are homogeneous in each partitioned space, wherein at least one lattice of the plurality of lattices has a smaller size, and the nodes of the at least one lattice are more densely distributed than sparsely distributed nodes of other lattices of the plurality of lattices;
(ii) transferring the shape of the real object to the simulation space by setting a space occupation state onto the respective nodes of the plurality of lattices of the simulation space;

(iii) modeling a fluid state by characteristics of a real fluid including density, pressure, temperature, and flow velocity of the fluid for the respective nodes of the plurality of lattices of the simulation space;
(iv) setting states including a probability distribution state of a particle with respect to velocity of the particle for the respective nodes of the plurality of lattices of the simulation space;
(v) generating the flow effect for the respective nodes of the plurality of lattices of the simulation space by using a collision rule, which is based on a probability distribution of the particle with respect to the velocity of the particle; the collision rule being obtained by satisfying a condition at which the Tsallis divergence between two discretized probability distributions which are the collision rule itself and a reference collision rule which is dependent on at least one of the variations of flow velocity and temperature has an extremal value under a given constraint to generate a simulated fluid flow result;
(vi) renewing the states based on the simulated fluid flow result; and
(vii) modeling, based on steps (i)-(vi), fluid flow around the real object.

16. A method for correctly, efficiently, and stably generating flow effect around a real object, comprising:
(i) by considering the real object, defining a simulation space having a plurality of lattices characterized by respective nodes, wherein, when an initial simulation space is partitioned according to sizes of the plurality of lattices, neighboring nodes have distances therebetween which are homogeneous in each partitioned space, wherein at least one lattice of the plurality of lattices has a smaller size, and the nodes of the at least one lattice are more densely distributed than sparsely distributed nodes of other lattices of the plurality of lattices;
(ii) transferring the shape of the real object to the simulation space by setting a space occupation state onto the respective nodes of the plurality of lattices of the simulation space;
(iii) modeling a fluid state by characteristics of a real fluid including density, pressure, temperature, and flow velocity of the fluid for the respective nodes of the plurality of lattices of the simulation space;
(iv) setting states including a probability distribution state of a particle with respect to velocity of the particle for the respective nodes of the plurality of lattices of the simulation space;
(v) generating the flow effect for the respective nodes of the plurality of lattices of the simulation space by using a collision rule, which is based on a probability distribution of the particle with respect to the velocity of the particle; the collision rule being obtained by satisfying a condition at which the Rényi divergence between two discretized probability distributions which are the collision rule itself and a reference collision rule which is dependent on at least one of the variations of flow velocity and temperature has an extremal value under a given constraint to generate a simulated fluid flow result;
(vi) renewing the states based on the simulated fluid flow result; and
(vii) modeling, based on steps (i)-(vi), fluid flow around the real object.

* * * * *